(12) United States Patent
Elson et al.

(10) Patent No.: US 9,813,529 B2
(45) Date of Patent: Nov. 7, 2017

(54) EFFECTIVE CIRCUITS IN PACKET-SWITCHED NETWORKS

(75) Inventors: Jeremy E. Elson, Seattle, WA (US); Edmund B. Nightingale, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 554 days.

(21) Appl. No.: 13/096,194

(22) Filed: Apr. 28, 2011

(65) Prior Publication Data

US 2012/0278400 A1 Nov. 1, 2012

(51) Int. Cl.
| | |
|---|---|
| *G06F 15/16* | (2006.01) |
| *H04L 29/14* | (2006.01) |
| *H04L 12/925* | (2013.01) |
| *H04L 29/06* | (2006.01) |
| *H04W 28/20* | (2009.01) |

(52) U.S. Cl.
CPC ............ *H04L 69/40* (2013.01); *H04L 47/722* (2013.01); *H04L 69/163* (2013.01); *H04W 28/20* (2013.01)

(58) Field of Classification Search
CPC ...... H04L 63/10; H04L 65/605; H04L 67/325
USPC ........................................................ 709/206
See application file for complete search history.

(56) References Cited

U.S. PATENT DOCUMENTS

| | | |
|---|---|---|
| 4,491,945 A | 1/1985 | Turner |
| 4,780,870 A | 10/1988 | McHarg et al. |
| 5,305,320 A | 4/1994 | Andrews et al. |
| 5,408,649 A | 4/1995 | Beshears et al. |
| 5,423,046 A | 6/1995 | Nunnelley et al. |
| 5,446,915 A | 8/1995 | Pierce |
| 5,553,285 A | 9/1996 | Krakauer et al. |
| 5,621,884 A | 4/1997 | Beshears et al. |

(Continued)

FOREIGN PATENT DOCUMENTS

| | | |
|---|---|---|
| EP | 2192729 A1 | 6/2010 |
| WO | WO03038628 A1 | 5/2003 |
| WO | WO2010108368 A1 | 9/2010 |

OTHER PUBLICATIONS

U.S. Appl. No. 12/410,697, "Data Center Without Structural Bottlenecks," Maltz et al, filed Mar. 25, 2009.

(Continued)

*Primary Examiner* — Richard G Keehn
(74) *Attorney, Agent, or Firm* — Jacob P. Rohwer; Newport IP, LLC (57) ABSTRACT

The creation of an effective circuit between a sender device and a receiver device over the packet-switched network is described herein. To establish the effective circuit, the sender device sends a request to the receiver device through the packet-switched network. The request is associated with a bandwidth reservation from the receiver device for reception of a message from the sender device. The receiver device receives multiple requests from multiple sender devices and reserves bandwidth for at least one of the sender devices. The receiver device then sends a response to the at least one sender device providing clearance to send the message to the receiver device using the reserved bandwidth, the request and response establishing the effective circuit. The receiver device may also decline the requests of the other sender devices, causing the other sender devices to send other requests to other receiver devices.

20 Claims, 6 Drawing Sheets

(56) References Cited

U.S. PATENT DOCUMENTS

| | | |
|---|---|---|
| 5,663,951 A | 9/1997 | Danneels et al. |
| 5,914,878 A | 6/1999 | Yamamoto et al. |
| 5,938,732 A | 8/1999 | Lim et al. |
| 5,970,232 A | 10/1999 | Passint et al. |
| 6,230,252 B1 | 5/2001 | Passint et al. |
| 6,424,979 B1 | 7/2002 | Livingston et al. |
| 6,577,613 B1 | 6/2003 | Ramanathan |
| 6,728,747 B1 | 4/2004 | Jenkins et al. |
| 6,850,489 B1 | 2/2005 | Omi et al. |
| 6,871,295 B2 | 3/2005 | Ulrich et al. |
| 6,963,996 B2 | 11/2005 | Coughlin |
| 7,076,555 B1 | 7/2006 | Orman et al. |
| 7,107,606 B2 | 9/2006 | Lee |
| 7,113,993 B1 | 9/2006 | Cappiello et al. |
| 7,115,919 B2 | 10/2006 | Kodama |
| 7,139,933 B2 | 11/2006 | Hsu et al. |
| 7,165,256 B2 | 1/2007 | Boudnik et al. |
| 7,171,491 B1 | 1/2007 | O'Toole et al. |
| 7,180,875 B1 | 2/2007 | Neumiller et al. |
| 7,184,958 B2 | 2/2007 | Kagoshima et al. |
| 7,231,475 B1 | 6/2007 | Singla et al. |
| 7,240,358 B2 | 7/2007 | Horn et al. |
| 7,272,613 B2 | 9/2007 | Sim et al. |
| 7,342,876 B2 | 3/2008 | Bellur et al. |
| 7,356,213 B1 * | 4/2008 | Cunningham et al. ......... 385/14 |
| 7,383,288 B2 | 6/2008 | Miloushev et al. |
| 7,433,332 B2 | 10/2008 | Golden et al. |
| 7,437,407 B2 | 10/2008 | Vahalia et al. |
| 7,496,233 B2 | 2/2009 | Kirihara et al. |
| 7,577,817 B2 | 8/2009 | Karpoff et al. |
| 7,610,348 B2 | 10/2009 | Kisley et al. |
| 7,657,581 B2 | 2/2010 | Orenstein et al. |
| 7,725,437 B2 | 5/2010 | Kirshenbaum et al. |
| 7,756,826 B2 | 7/2010 | Bots et al. |
| 7,769,843 B2 | 8/2010 | Neuse et al. |
| 7,774,469 B2 | 8/2010 | Massa et al. |
| 7,779,148 B2 * | 8/2010 | Arimilli et al. ............... 709/235 |
| 7,797,453 B2 | 9/2010 | Meijer et al. |
| 7,801,994 B2 | 9/2010 | Kudo |
| 7,805,580 B2 | 9/2010 | Hirzel et al. |
| 7,817,880 B1 * | 10/2010 | Drost et al. ...................... 385/14 |
| 7,840,136 B1 * | 11/2010 | Cunningham et al. ......... 398/45 |
| 7,916,703 B2 * | 3/2011 | Yang et al. .................... 370/338 |
| 7,930,595 B2 | 4/2011 | Gooding |
| 8,001,352 B1 | 8/2011 | Chatterjee et al. |
| 8,010,829 B1 | 8/2011 | Chatterjee et al. |
| 8,037,478 B2 | 10/2011 | Tanaka et al. |
| 8,041,760 B2 | 10/2011 | Mamou et al. |
| 8,074,107 B2 | 12/2011 | Sivasubramanian et al. |
| 8,160,063 B2 | 4/2012 | Maltz et al. |
| 8,181,061 B2 | 5/2012 | Nightingale et al. |
| 8,195,950 B2 * | 6/2012 | Spearman .................... 713/182 |
| 8,234,518 B2 | 7/2012 | Hansen |
| 8,261,033 B1 | 9/2012 | Slik et al. |
| 8,266,136 B1 | 9/2012 | Pogde et al. |
| 8,274,987 B2 * | 9/2012 | Jia ................................. 370/401 |
| 8,296,398 B2 | 10/2012 | Lacapra et al. |
| 8,296,408 B2 | 10/2012 | Anke et al. |
| 2001/0042157 A1 * | 11/2001 | Pascucci et al. .............. 711/103 |
| 2002/0083134 A1 | 6/2002 | Bauer, Jr. et al. |
| 2002/0093948 A1 * | 7/2002 | Dertz et al. .................... 370/355 |
| 2002/0152293 A1 | 10/2002 | Hahn et al. |
| 2002/0194245 A1 | 12/2002 | Simpson et al. |
| 2003/0014393 A1 | 1/2003 | Kabra et al. |
| 2003/0131207 A1 | 7/2003 | Arakawa et al. |
| 2004/0085953 A1 | 5/2004 | Davis |
| 2004/0153479 A1 | 8/2004 | Mikesell et al. |
| 2005/0075911 A1 | 4/2005 | Craven, Jr. |
| 2005/0078655 A1 | 4/2005 | Tiller et al. |
| 2005/0094640 A1 | 5/2005 | Howe |
| 2005/0111423 A1 * | 5/2005 | Anderson et al. ............. 370/341 |
| 2005/0138186 A1 | 6/2005 | Hesselink et al. |
| 2005/0262097 A1 | 11/2005 | Sim-Tang et al. |
| 2006/0004759 A1 | 1/2006 | Borthakur et al. |
| 2006/0015495 A1 | 1/2006 | Keating et al. |
| 2006/0074946 A1 | 4/2006 | Pham |
| 2006/0098572 A1 | 5/2006 | Zhang et al. |
| 2006/0129614 A1 | 6/2006 | Kim et al. |
| 2006/0159456 A1 | 7/2006 | Gumaste et al. |
| 2006/0280168 A1 | 12/2006 | Ozaki |
| 2006/0288080 A1 | 12/2006 | Orszag et al. |
| 2007/0025381 A1 | 2/2007 | Feng et al. |
| 2007/0036093 A1 * | 2/2007 | Newberg et al. .............. 370/260 |
| 2007/0043824 A1 * | 2/2007 | Fremantle ...................... 709/214 |
| 2007/0094691 A1 * | 4/2007 | Gazdzinski ...................... 725/62 |
| 2007/0147322 A1 * | 6/2007 | Agrawal et al. ............... 370/338 |
| 2007/0153755 A1 * | 7/2007 | Yang et al. .................... 370/338 |
| 2007/0156842 A1 | 7/2007 | Vermeulen et al. |
| 2007/0158432 A1 | 7/2007 | Tadamasa |
| 2007/0204028 A1 | 8/2007 | Lee |
| 2007/0230493 A1 * | 10/2007 | Dravida et al. ................ 370/412 |
| 2007/0266208 A1 | 11/2007 | Kim et al. |
| 2007/0266244 A1 * | 11/2007 | Walker et al. ................. 713/168 |
| 2007/0286135 A1 * | 12/2007 | Kirke ............................. 370/338 |
| 2008/0005275 A1 | 1/2008 | Overton et al. |
| 2008/0010400 A1 | 1/2008 | Moon |
| 2008/0098392 A1 | 4/2008 | Wipfel et al. |
| 2008/0104442 A1 | 5/2008 | Diao et al. |
| 2008/0114827 A1 | 5/2008 | Gerber et al. |
| 2008/0162622 A1 | 7/2008 | Becker et al. |
| 2008/0215727 A1 | 9/2008 | Denis et al. |
| 2008/0256138 A1 | 10/2008 | Sim-Tang |
| 2009/0006888 A1 | 1/2009 | Bernhard et al. |
| 2009/0097443 A1 * | 4/2009 | Pasanen et al. ............... 370/329 |
| 2009/0106269 A1 | 4/2009 | Zuckerman et al. |
| 2009/0109891 A1 * | 4/2009 | Fonseca et al. ............... 370/315 |
| 2009/0112921 A1 | 4/2009 | Oliveira et al. |
| 2009/0113323 A1 | 4/2009 | Zhao et al. |
| 2009/0144422 A1 | 6/2009 | Chatley et al. |
| 2009/0183002 A1 | 7/2009 | Rohrer et al. |
| 2009/0198958 A1 * | 8/2009 | Arimilli et al. .................. 712/29 |
| 2009/0201923 A1 * | 8/2009 | Menon et al. ................. 370/388 |
| 2009/0204405 A1 | 8/2009 | Kato et al. |
| 2009/0213731 A1 * | 8/2009 | Bhasin et al. ................. 370/230 |
| 2009/0249418 A1 * | 10/2009 | Alastruey Gracia et al. 725/114 |
| 2009/0259665 A1 | 10/2009 | Howe et al. |
| 2009/0265218 A1 | 10/2009 | Amini et al. |
| 2009/0268611 A1 | 10/2009 | Persson et al. |
| 2009/0271412 A1 | 10/2009 | Lacapra et al. |
| 2009/0300407 A1 | 12/2009 | Kamath et al. |
| 2009/0307329 A1 | 12/2009 | Olston et al. |
| 2010/0005151 A1 | 1/2010 | Gokhale |
| 2010/0008230 A1 | 1/2010 | Khandekar et al. |
| 2010/0008347 A1 | 1/2010 | Qin et al. |
| 2010/0061366 A1 * | 3/2010 | DelRegno et al. ............ 370/389 |
| 2010/0094955 A1 | 4/2010 | Zuckerman et al. |
| 2010/0094956 A1 | 4/2010 | Zuckerman et al. |
| 2010/0153639 A1 | 6/2010 | Corry et al. |
| 2010/0161657 A1 | 6/2010 | Cha et al. |
| 2010/0191919 A1 | 7/2010 | Bernstein et al. |
| 2010/0198888 A1 | 8/2010 | Blomstedt et al. |
| 2010/0198972 A1 | 8/2010 | Umbehocker |
| 2010/0228835 A1 | 9/2010 | Pitts |
| 2010/0250648 A1 | 9/2010 | Cao et al. |
| 2010/0250746 A1 | 9/2010 | Murase |
| 2010/0277345 A1 * | 11/2010 | Rodriguez et al. ............ 340/945 |
| 2010/0332454 A1 | 12/2010 | Prahlad et al. |
| 2010/0332818 A1 | 12/2010 | Prahlad et al. |
| 2011/0022574 A1 | 1/2011 | Hansen |
| 2011/0075628 A1 * | 3/2011 | Cho et al. ...................... 370/329 |
| 2011/0083154 A1 * | 4/2011 | Boersma ........................ 725/109 |
| 2011/0099126 A1 * | 4/2011 | Belani et al. .................. 705/418 |
| 2011/0145442 A1 * | 6/2011 | Diab ............................... 709/247 |
| 2011/0153835 A1 | 6/2011 | Rimac et al. |
| 2011/0161723 A1 | 6/2011 | Taleck et al. |
| 2011/0205974 A1 * | 8/2011 | Zhu et al. ...................... 370/329 |
| 2011/0208837 A1 | 8/2011 | Sartori |
| 2011/0219208 A1 | 9/2011 | Asaad et al. |
| 2011/0228789 A1 * | 9/2011 | Jia ................................ 370/401 |
| 2011/0246471 A1 | 10/2011 | Rakib |
| 2011/0246735 A1 | 10/2011 | Bryant et al. |
| 2011/0258290 A1 | 10/2011 | Nightingale et al. |
| 2011/0258297 A1 | 10/2011 | Nightingale et al. |
| 2011/0258482 A1 | 10/2011 | Nightingale et al. |

(56) References Cited

U.S. PATENT DOCUMENTS

| | | | |
|---|---|---|---|
| 2011/0258488 | A1 | 10/2011 | Nightingale et al. |
| 2011/0283019 | A1 | 11/2011 | Bennett et al. |
| 2011/0292949 | A1* | 12/2011 | Hayashi et al. ............. 370/419 |
| 2011/0296025 | A1 | 12/2011 | Lieblich et al. |
| 2011/0307886 | A1 | 12/2011 | Thanga et al. |
| 2012/0041976 | A1 | 2/2012 | Annapragada |
| 2012/0042162 | A1 | 2/2012 | Anglin et al. |
| 2012/0047239 | A1 | 2/2012 | Donahue et al. |
| 2012/0054556 | A1 | 3/2012 | Grube et al. |
| 2012/0158948 | A1* | 6/2012 | Pang et al. .................... 709/224 |
| 2012/0197958 | A1 | 8/2012 | Nightingale et al. |
| 2012/0207036 | A1* | 8/2012 | Ong et al. ..................... 370/252 |
| 2012/0224481 | A1* | 9/2012 | Babiarz et al. ............ 370/230.1 |
| 2012/0256735 | A1* | 10/2012 | Gilson ....................... 340/12.17 |
| 2012/0278400 | A1* | 11/2012 | Elson et al. .................. 709/206 |
| 2015/0052392 | A1 | 2/2015 | Mickens et al. |

OTHER PUBLICATIONS

U.S. Appl. No. 12/410,745, "Data Center Interconnect and Traffic Engineering," Maltz et al, filed Mar. 25, 2009.

U.S. Appl. No. 12/578,608, "Agile Data Center Network Architecture," Greenberg et al, filed Oct. 14, 2009.

Akturk, "Asynchronous Replication of Metadata Across Multi-Master Servers in Distributed Data Storage Systems", A Thesis Submitted to Louisiana State University and Agricultural and Mechanical College, Dec. 2009, 70 pages.

Buddhikot et al, "Design of a Large Scale Multimedia Storage Server," Journal Computer Networks and ISDN Systems, vol. 27, Issue 3, Dec. 1994, pp. 1-18.

"Citrix Storage Delivery Services Adapter for NetApp Data ONTAP", retrieved on Mar. 9, 2010 at <<http://citrix.com/site/resources/dynamic/partnerDocs/datasheet_adapter.pdf>>, Citrix Systems, Citrix Storage Delivery Services Data sheet, 2008, 2 pgs.

"EMC RecoverPoint Family: Cost-effective local and remote data protection and disaster recovery solution", retrieved on Mar. 9, 2010 at <<http://www.emc.com/collateral/software/data-sheet/h2769-emc-recoverpoint-family.pdf>>, EMC Corporation, Data Sheet H2769.8, 2010, 3 pgs.

Fu, et al., "A Novel Dynamic Metadata Management Scheme for Large Distributed Storage Systems", Proceedings of the 2008 10th IEEE International Conference on High Performance Computing and Communications, Sep. 2008, pp. 987-992.

Fullmer et al, "Solutions to Hidden Terminal Problems in Wireless Networks," Proceedings of the ACM SIGCOMM '97 Conference on Applications, Technologies, Architectures, and Protocols for Computer Communication, Cannes, France, Oct. 1997, pp. 39-49.

Lang, "Parallel Virtual File System, Version 2", retrieved on Nov. 12, 2010 from <<http://www.pvfs.org/cvs/pvfs-2-7-branch.build/doc/pvfs2-guide/pvfs2-guide.php>>, Sep. 2003, 39 pages.

Mohamed et al, "Extensible Communication Architecture for Grid Nodes," abstract retrieved on Apr. 23, 2010 at <<http://www.computer.org/portal/web/csdl/doi/10.1109/itcc.2004.1286587>>, International Conference on Information Technology: Coding and Computing (ITCC'04), vol. 2, Apr. 5-7, 2004, Las Vegas, NV, 1 pg.

Weil et al, "CRUSH: Controlled, Scalable, Decentralized Placement of Replicated Data," Proceedings of SC '06, Nov. 2006, 12 pgs.

Weiser, "Some Computer Science Issues in Ubiquitous Computing," retrieved at <<https://www.cs.ucsb.edu/~ravenben/papers/coreos/Wei93.pdf>>, Mar. 1993, 14 pgs.

Bafna et al, "CHIRAYU: A Highly Available Metadata Server for Object Based Storage Cluster File System," retrieved from <<http://abhinaykampasi.tripod.com/TechDocs/ChirayuPaper.pdf>>, IEEE Bombay Section, Year 2003 Prof K Shankar Student Paper & Project Contest, Apr. 2003, 6 pgs.

Chen et al, "Replication-Based Highly Available Metadata Management for Cluster File Systems," 2010 IEEE International Conference on Cluster Computing, Sep. 2010, pp. 292-301.

Fan et al, "A Failure Recovery Mechanism for Distributed Metadata Servers in DCFS2," Seventh International on High Performance Computing and Grid in Asia Pacific Region, Jul. 20-22, 2004, 7 pgs.

Sinnamohideen et al, "A Transparently-Scalable Metadata Service for the Ursa Minor Storage System," USENIXATC'10 Proceedings of the 2010 USENIX Conference, Jun. 2010, 14 pgs.

Office Action for U.S. Appl. No. 13/017,193, dated Jun. 3, 2013, Nightingale et al., "Parallel Serialization of Request Processing", 21 pages.

Non-Final Office Action for U.S. Appl. No. 13/112,978, dated Jul. 17, 2013, Elson et al., "Data Layout for Recovery and Durability", 15 pages.

Office Action for U.S. Appl. No. 12/766,726, dated May 29, 2012, Nightingale et al., "Bandwidth-Proportioned Datacenters", 21 pages.

Office Action for U.S. Appl. No. 12/763,107, dated Jul. 20, 2012, Nightingale et al., "Locator Table and Client Library for Datacenters", 11 pages.

Non-Final Office Action for U.S. Appl. No. 12/763,133, dated Sep. 16, 2011, Edmund Nightingale, "Memory Management and Recovery for Datacenters", 18 pages.

Office action for U.S. Appl. No. 13/116,270, dated Feb. 15, 2013, Nightingale et al., "Server Failure Recovery",16 pages.

Rhea et al., "Maintenance-Free Global Data Storage", IEEE Internet Computing, Sep./Oct. 2001, pp. 40-49.

Isard, et al., "Dryad: Distributed Data-Parallel Programs from Sequential Building Blocks", In Proceedings of the 2nd ACM SIGOPS/EuroSys European Conference on Computer Systems, Mar. 21, 2007, 14 pages.

Kennedy, "Is Parallel Computing Dead", retrieved on Oct. 2, 2012, at http://www.crpc.rice.edu/newsletters/oct94/director.html., Parallel Computing Newsletter, vol. 2, Issue 4, Oct. 1994, 2 pages.

Office Action for U.S. Appl. No. 13/412,944, dated Oct. 11, 2012, Nightingale et al., "Reading and Writing During Cluster Growth Phase", 9 pages.

Office Action for U.S. Appl. No. 13/112,978, dated Dec. 14, 2012, Elson et al., "Data Layout for Recovery and Durability", 13 pages.

Office Action for U.S. Appl. No. 13/017,193, dated Dec. 3, 2012, Nightingale et al., "Parallel Serialization of Request Processing", 19 pages.

PCT Search Report and Written Opinion dated Oct. 23, 2012 for PCT Application No. PCT/US2012/035792, 10 pages.

U.S. Appl. No. 13/598,990, "Block Level Access to Parallel Storage", Fan et al, filed Aug. 30, 2012.

Baratto et al., "THINC: A Remote Display Architecture for Thin-Client Computing", In Technical Report CUCS-027-04, Jul. 2004, 15 pages.

Bonwick et al., "ZFS: The Last Word in File Systems", retrieved at <<wiki.illumos.org/download/attachments/1146951zfs_last.pdf>>, Sun microsystems, Sep. 2008, 44 pages.

Borthakur, "The Hadoop Distributed File System: Architecture and Design", retrieved at <<http://hadoop.apache.org/docs/stable/hdfs_design.html>>, The Apache Software Foundation, Mar. 2013, 8 pages.

Braam, "The Lustre Storage Architecture", Cluster File Systems, Inc., Aug. 2004, 439 pages.

Carnes rt al., "PVFS: A Parallel File System for Linux Clusters", In Proceedings of the Extreme Linux Track: 4th Annual Linux Showcase and Conference, Oct. 2000, 11 pages.

"Citrix Xen-Desktop Virtualization Desktop Infrastructure", retrieved on Jun. 11, 2013 at <<http://www.citrix.com/solutions/desktop-virtualization/overview.html>> Citrix Systems, Inc., 2 pages.

Norton et al., "Common Internet File System (CIFS) Technical Reference", Storage Networking Industry Association, Mar. 2002, 150 pages.

Feller, Virtual Desktop Resource Allocation, retrieved at <<http://blogs.citrix.com/2010/11/12/virtual-desktop-resource-allocation>>, Citrix Systems, Inc., Nov. 2010, 2 pages.

Fellows, "Storage Optimization for VDI", Storage Networking Industry Association, 2011, 42 pages.

(56) References Cited

OTHER PUBLICATIONS

Ghemawat et al., "The Google File System", In Proceedings of the Ninetheenth ACM Symposium on Operating Systems Principles, Oct. 2003, 15 pages.
Greenberg et al., "Towards a Next Generation Data Center Architecture: Scalability and Commoditization", In Proceedings of theACM Workshop on Programmable Routers for Extensible Service of Tomorrow, Aug. 2008, pp. 57-62.
Hartman et al., "The Zebra Striped Network File System" In Proceedings of the Fourteenth ACM Symposium on Operating Systems Principles, Dec. 1993, pp. 29-43.
Hitz et al., "File System Design for an NFS File Server Appliance" USENIX Winter 1994 Conference, Jan. 1994, 23 pages.
Hopkins et al., "AoE (ATA over Ethernet)", The Brantley Coile Company, Inc., Feb. 2009, 14 pages.
TechNet, "How Dynamic Disks and Volumes Work", available at <<http://technet.microsoft.com/en-us/library/cc758035>>, Microsoft, last updated Mar. 2003, 19 pages.
Howard et al., "Scale and Performance in a Distributed File System", Journal of ACM Transactions on Computer Systems, vol. 6, Issue 1, Feb. 1988, pp. 51-81.
Hsiao et al., "Chainted Declustering: A New Availability olablility Strategy for Multiprocessor Database Machines", Sixth Annual Conference on Data Engineering, Feb. 1990, 10 pages.
TechNet, "Jetstress Field Guide", retrieved at <<http://gallery.technet.microsoft.com/Jetstress-Field-Guide-1602d64c>>, Microsoft, Inc., Nov. 2010, 1 page.
Kistler et al., "Disconnected Operation in the Coda File System", ACM Transactions on Computer Systems, vol. 10, No. 1, Feb. 1992, pp. 3-25.
Krioukov et al., "Parity Lost and Parity Regained", The Proceedings of the 6th USENIX Conference on File and Storage Technologies, Feb. 2008, pp. 127-141.
Lee et al., "Petal: Distributed Virtual Disks", In The Proceedings of the 7th International Conference on Architectural Support for Porgramming Languages and Operating Systems, vol. 31, No. 9, Sep. 1996, 9 pages.
Lim et al., "Voluntary Disconnected Operations for Energy Efficient Mobile Devices in Pervasive Computing Environments", In Intelligent Automation & Soft Computing, vol. 19, Issue 1, Mar. 2013, pp. 1-12.
Menon et al., "IBM Storage Tank—A heterogeneous scalable SAN file system", IBM Systems Journal, vol. 42, No. 2, 2003, pp. 250-267.
Nightingale et al., "Flat Datacenter Storage", 10th USENIX Symposium on Operating Systems Design and Implementation, Oct. 18, 2012, 15 pages.
Nightingale et al., "Rethink the Sync", 7th USENIX Symposium on Operating Systems Design and Implementation, Nov. 2006, 14 pages.
Office action for U.S. Appl. No. 13/112,978, dated Jan. 16, 2014, Elson, et al., "Data Layout for Recovery and Durability", 18 pages.
Office action for U.S. Appl. No. 13/116,270, dated Aug. 27, 2013, Nightingale, et al., "Server Failure Recovery", 18 pages.
Office action for U.S. Appl. No. 13/017,193, dated Dec. 5, 2013, Nightingale, et al., "Parallel Serialization of Request Processing", 19 pages.
Pawlowski et al., "NFS Version 3 Design and Implementation", Summer USENIX Conference, Jun. 1994, 15 pages.
Rodeh et al., "zFS—A Scalable Distributed File System Using Object Disks", 20th IEEE/11th NASA Goddard Conference on Mass Storage Systems and Technologies, Apr. 2003, 12 pages.
Satran et al., "Internet Small Computer Systems Interface (iSCSI)", Technical Report, RFC3720, IBM, Apr. 2004, 155 pages.
Schmuck et al., "GPFS: A Shared-Disk File System for Large Computing Clusters", In Proceedings of the Conference on File and Storage Technologies (FAST'02), Jan. 2002, pp. 231-244.
Shepler et al., "Network File System (NFS) Version 4 Minor Version 1 Protocol", Technical Report, RFC 5661, Internet Engineering Task Force, Jan. 2010, 618 pages.
Terry et al, "Managing Update Conflicts in Bayou, a Weakly Connected Replicated Storage System", in Proceedings of the 15th ACM Symposoim on Operating System Principles, Dec. 1995, pp. 172-183.

Verbowski et al., "Flight Data Recorder: Monitoring Persistent-State Interactions to Improve Systems Management", in Proceedings of the 7th USENIX Symposium on Operating Systems Design and Implementation, Nov. 2006, pp. 117-130.
"VMware View—Your Cloud, Your Desktop, Just Got Better", retrieved Jun. 2013 at <<www.vmware.com/files/pdf/view/VMware-View-Datasheet.pdf>>, VMware, Inc., 4 pages.
Vrable et al., "BlueSky: A Cloud-Backed File System for the Enterprise", Proceedings of the 10th USENIX Conference on File and Storage, Feb. 2013, 14 pages.
Vrable et al., "Cumulus: Filesystem Backup to the Cloud", In 7th USENIX Conference on File Storage Technologies, Published Feb. 24, 2009, pp. 1-14.
Vrable, "Migrating Enterprise Storage Applications to the Cloud", In Doctoral Dissertation, University of California, Published 2011, pp. 1-112.
Weil et al., "Ceph: A Scalable, High-Performance Distributed File System" in Proceedings of the 7th USENIX Symposium on Operating Systems Design and Implementation, Nov. 2006, pp. 307-320.
Weinsberg et al., "A Programming Model and System Support for Disconnected-Aware Applications on Resource-Constrained Devices", in Proceedings of the 24th International Conference on Software Engineering, May 2002, pp. 374-384.
Welch et al., "Scalable Performance of the Panasas Parallel File System" in Proceedings of the 8th USENIX Conference on File and Storage Technologies, Feb. 2008, pp. 17-33.
TechNet, "Windows PE Technical Reference", available at <<http://technet.microsoft.com/en-us/library/dd744322>>, Microsoft, Oct. 2009, 2 pages.
European Office Action dated May 23, 2014 for European patent application No. 12776594.9, a counterpart foreign application of U.S. Appl. No. 13/096,194, 6 pages.
Supplementary European Search Report dated May 13, 2014 for European Patent Application No. 12776594.9, 4 pages.
Office action for U.S. Appl. No. 13/112,978 dated May 22, 2014, Elson et al., "Data Layout for Recovery and Durability", 11 pages.
Office Action for U.S. Appl. No. 13/017,193, dated Jul. 18, 2014, Edmund B. Nightingale, "Parallel Serialization of Request Processing", 21 pages.
Office Action for U.S. Appl. No. 13/116,270, dated Aug. 14, 2014, Edmund B. Nightingale, "Server Failure Recovery", 15 pages.
European Office Action dated Oct. 6, 2014 for European patent application No. 12776594.9, a counterpart foreign application of U.S. Appl. No. 13/096,194, 6 pages.
Corbett et.al. "The Vesta Parallel File System" ACM Transactions on Computer Systems, vol. 14, No. 3, Aug. 1996, 40 pgs.
He et al, "Performance Evaluation of Distributed iSCSI Raid", Proc of Intl Workshop on Storage Network Architecture and Parallel I/Os, Sep. 2003, 8 pgs.
International Search Report for PCT Application No. PCT/US2013/056070, dated Nov. 20, 2013; Filed Date Aug. 22, 2013, 11 pgs.
"Introduction to the Azure Platform", Microsoft Patterns & Practices, retrieved at <<http:f/msdn.microsoft.com/en-us/libraryfff803364.aspx>>, Dec. 6, 2011, pp. 1-13.
Lesem, Steve, "Cloud Storage Strategy", Cloud Taxonomy Archives, retrieved at <<http:f/cloudstoragestrategy.com/cloud-taxonomy/>>, Jan. 24, 2012, pp. 1-21.
Office action for U.S. Appl. No. 13/112,978, dated Dec. 3, 2014, Elson, et al., "Data Layout for Recovery and Durability", 14 pages.
Ousterhout, et al., "The Case for RAMClouds: Scalable High-Performance Storage Entirely in DRAM", SIGOPS Operating Systems Review, vol. 43, D No. 4, Dec. 2009, pp. 92-105.
European Office Action dated Apr. 1, 2015 for European patent application No. 12776594.9, a counterpart foreign application of U.S. Appl. No. 13/096,194, 6 pages.
Office action for U.S. Appl. No. 13/116,270, dated Mar. 12, 2015, Nightingale et al., "Server Failure Recovery", 9 pages.
Office action for U.S. Appl. No. 13/112,978, dated Apr. 3, 2015, Elson et al., "Data Layout for Recovery and Durability", 16 pages.
Office Action for U.S. Appl. No. 13/598,990, dated Sep. 11, 2014, Fan et al., "Block-level Access to Parallel Storage", 8 pages.

* cited by examiner

FIG. 1

| Msg ID 206 | RTS? 208 | Receiver Device 210 |
|---|---|---|
| 0001 | Y | Receiver 1 |
| 0010 | N | Receiver 2 |
| 0011 | N | Receiver 1 |
| 0100 | N | Receiver 3 |

Messages 204

Queue 202

FIG. 2a

Receiver 1 Queue 212

| Msg ID 206 | RTS? 208 |
|---|---|
| 0001 | Y |
| 0011 | N |

Messages 204

Receiver 2 Queue 214

| Msg ID 206 | RTS? 208 |
|---|---|
| 0010 | N |

Messages 204

Receiver 3 Queue 216

| Msg ID 206 | RTS? 208 |
|---|---|
| 0100 | N |

Messages 204

FIG. 2b

| Msg ID 306 | Num. BTLs 308 | Priority 310 | Sender Device 312 |
|---|---|---|---|
| 1010 | 5 | N | Sender 1 |
| 0010 | 0 | Y | Sender 2 |
| 1001 | 1 | N | Sender 3 |
| 0101 | 0 | N | Sender 2 |

Messages 304

Queue 302

EFFECTIVE CIRCUITS IN PACKET-SWITCHED NETWORKS

BACKGROUND

Messages are often transmitted through packet-switched networks using the Transmission Control Protocol/Internet Protocol (TCP/IP) suite of protocols. TCP/IP determines the path bandwidth for message transmission by a sender device using a trial-and-error approach. The rate at which the sender device sends messages is increased until packet loss occurs. TCP/IP detects packet loss by noting that an acknowledgement was not received for a sent message. Packet loss often results from events such as buffer overflows that occur at intermediate or endpoint devices. Upon detecting packet loss, TCP/IP decreases the transmission rate and transmits messages at a gradually increasing rate until packet-loss is again detected. While this approach may work well for the transmission of a large number of messages between a device pair, it is not efficient for transmitting a small message or small number of messages because the messages may all be transmitted before TCP/IP has an opportunity to detect packet loss. If the initial rate used was too high, all of the messages sent may need to be retransmitted.

In addition to retransmission, packet loss may also result in a temporary halt of message transmission from a sender device. When TCP/IP detects a certain number of packet losses in a time period, the network is assumed to be congested and TCP/IP increases the delay between the transmission of messages from the sender device that is experiencing the packet loss. Such a delay can be far more costly to overall performance than retransmission. A sender device with ample bandwidth allowing parallel transmission of many small messages to many receivers may be at particular risk of having transmission halted when using TCP/IP.

The use of full bisection bandwidth networks can alleviate congestion in the core, but packet loss may still occur at end-stations. If TCP uses loss as a congestion signal, unnecessary retransmission delays can still occur.

Another approach for message transmission is to establish a circuit between two devices across the network. Circuits typically involve bandwidth allocation for a communication channel between the devices at the devices themselves and at each intermediate device. Because of the high cost of setting up and tearing down circuits, however, the short messages that typify many network applications cannot justify the cost of circuit set-up.

SUMMARY

Sender and receiver devices communicating through a packet-switched network establish an effective circuit between themselves by exchanging a request to send a message and a response providing clearance to send that message. Sufficient bandwidth is ensured at the sender device by limiting the number of messages to be transmitted in parallel and is reserved at the receiver device responsive to receipt by the receiver device of a request to transmit a message. The packet-switched network between the sender and receiver devices may be a full bisection bandwidth network or a high bisection bandwidth network, making bandwidth reservation at intermediate devices unnecessary. The receiver device may also be configured to decline sender requests when the received requests would utilize more bandwidth than is available to the receiver device. Responsive to having its request declined, a sender device may select a different message directed to a different receiver device and may transmit a request to send that message to the different receiver device. By switching to a different message and a different receiver device, the sender device ensures that it does not sit idle while it has messages to transmit.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Described herein are techniques for establishing an effective circuit over a packet-switched network between a sender device and a receiver device. As used herein, the term "effective circuit" refers to a communication channel between two endpoint devices in which channel bandwidth is ensured. In contrast to a traditional circuit, the effective circuit discussed herein does not require substantial overhead to establish. By utilizing a full bisection bandwidth or high bisection bandwidth packet-switched network, reservation of bandwidth at intermediate devices becomes unnecessary. Bandwidth is ensured at the endpoints of the effective circuit by limiting message transmission at the sender device and by reserving bandwidth at the receiver device for messages of the sender device.

This disclosure leverages the observation that, in high- or full-bisection-bandwidth networks, the congestion occurs entirely at end-stations (sender and receiver devices), not in the network core. Consequently, it becomes feasible to do bandwidth allocation at the edges of the network, rather than the traditional method of watching for packet loss—which is an implicit signal from the network core.

To reserve receiver device bandwidth, the sender device transmits a request to send (RTS) message for each data message the sender device has to send to the receiver device.

The sender device may have multiple data messages to transmit to one or more receiver devices and may limit the number of RTS messages sent based the bandwidth of the sender device for transmission of the data messages. In limiting the number of RTS messages, the sender device may assume negative responses to at least some of the RTS messages and thus request transmission of data messages that collectively would use greater bandwidth to transmit than the sender device has available. In some embodiments, the sender device may have a number of data messages to transmit to a single receiver device and may send one RTS message for the multiple data messages.

The receiver devices may receive RTS messages from multiple sender devices. These RTS messages may request permission to send data messages that collectively would use greater bandwidth to receive than the receiver device has available. To ensure that it only receives as many simultaneous or concurrent data messages as it has bandwidth to receive, the receiver device may reserve bandwidth for one or more sender devices to transmit their data messages and respond to RTS messages of other sender devices with a message declining their requests to send data messages (these negative responses are referred to herein as "busy try later" (BTL) messages). The receiver device responds to sender devices for which it has reserved bandwidth with messages providing clearance to send data messages (these messages providing clearance to send are referred to herein as "CTS messages"). In selecting which sender devices to respond to with CTS messages, the receiver device may order the RTS messages in some fashion. For example, the receiver device may order the RTS messages based on priorities included in the RTS messages or based on numbers of BTL messages previously sent to the sender devices of the RTS messages.

Upon receiving a CTS messages, an effective circuit is established between the receiving sender device and the receiver device. The sender device then may proceed to send the data messages for which clearance was received to the receiver device. In some embodiments, the receiver device may only respond with CTS messages for a subset of the RTS messages sent to that receiver device by the sender device.

In response to receiving a BTL message, the sender device may select a different data message directed to a different receiver device and send an RTS message for that data message to that receiver device. In some embodiments, the data messages may be queued by the sender device and the sender device may select a first message from the queue that is directed to a different receiver device and for which an RTS has not previously been sent. By reserving bandwidth at an alternative receiver device, the sender device ensures that it does not have idle bandwidth while having data messages to send.

In some embodiments, the sender device need not send an RTS for every data message. Data messages that are control messages or that are smaller than a threshold size may simply be sent to receiver devices without establishing an effective circuit. This further reduces the overall overhead of the scheme.

Example Environment

Figure 1:
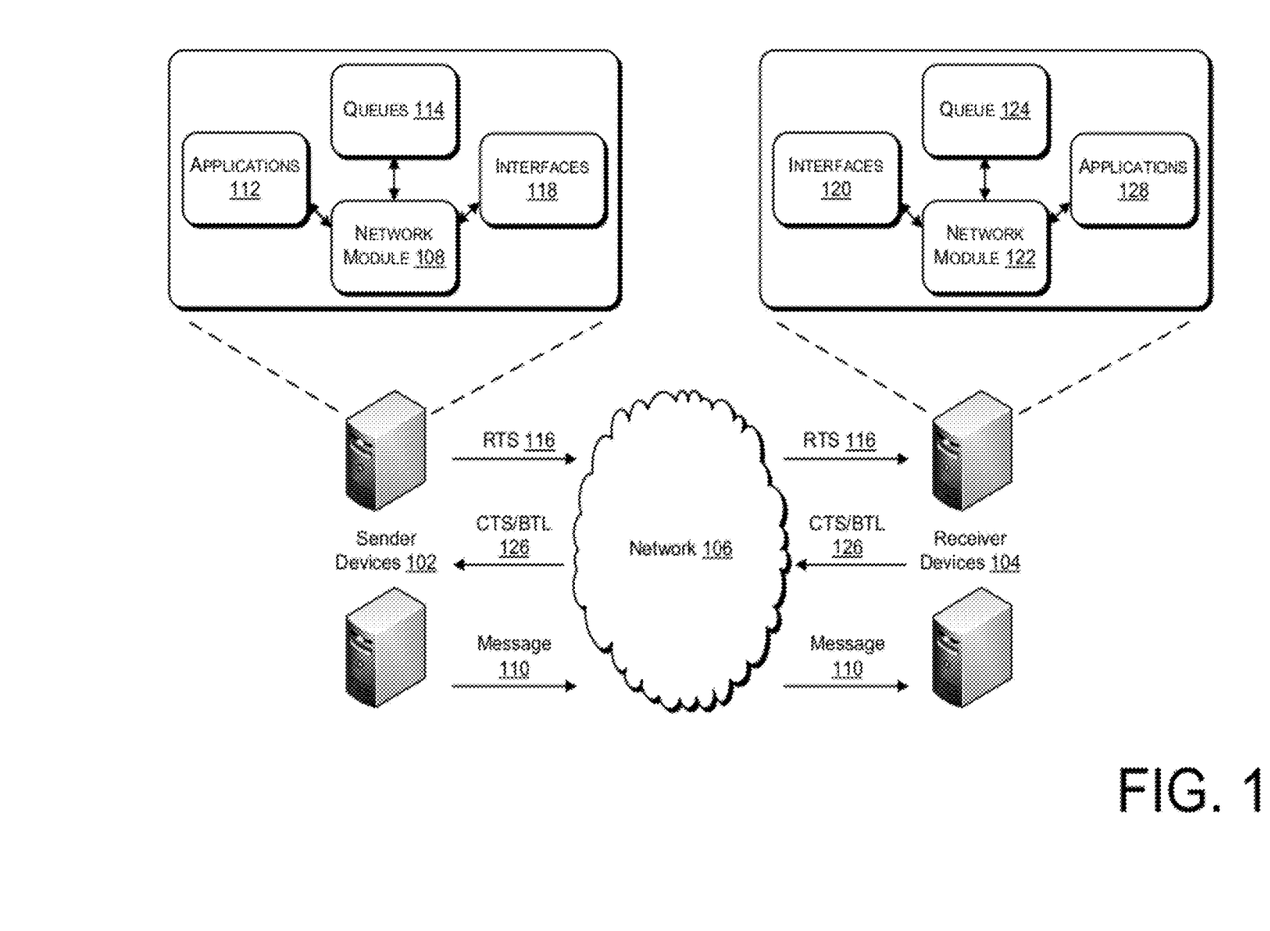
FIG. 1 illustrates an example environment, in accordance with various embodiments.

FIG. 1 illustrates an example environment, in accordance with various embodiments. As shown in FIG. 1, sender devices 102 may communicate with receiver devices 104 through a packet-switched network 106. The sender devices 102 may be equipped with network modules 108 that receive messages 110 from applications 112 of the sender devices 102 for transmission to the receiver devices 104. The network modules 108 may queue the messages 110 in queues 114 of the sender devices 102. Prior to transmitting the messages 110 to the receiver devices 104, the network modules 108 may transmit request to send (RTS) messages 116 for the messages 110 to the receiver devices 104 via interfaces 118 of the sender devices 102. These RTS messages 116 may then be received via interfaces 120 of the receiver devices 104 and processed by network modules 122 of the receiver devices 104. The network modules 122 may queue the RTS messages 116 in queues 124 of the receiver devices 104 for ordering of the RTS messages 116. The receiver devices 104 may then respond to the RTS messages 116 with messages 126 providing clearance to send (i.e., CTS messages) the messages 110 or with messages 126 declining the RTS messages 116 (i.e., BTL messages). Sender devices 102 receiving CTS messages 126 may then transmit the messages 110 to applications 128 of the receiver devices 104, the messages 110 being directed to those applications 128 by the applications 112 of the sender devices 102. Sender devices 102 receiving BTL messages 126 may select other receiver devices 104.

While the sender devices 102 and receiver devices 104 are shown herein as separate and distinct devices, it is to be understood that any computing device may be both a sender device 102 for some messages 110 and a receiver device 104 for other messages 110. Such a computing device would thus be equipped with the network module 108, applications 112, and queues 114 of a sender device 102 and with the network module 122, the queues 124, and the applications 128 of a receiver device 104. A computing device configured to be capable of acting as both a sender device 102 and a receiver device 104 may also have a single set of interfaces—in which case interfaces 118 and interfaces 120 would refer to a same set of interfaces—or two sets of interfaces—in which case one set (interfaces 118) may be dedicated to sending messages 110 and another set (interfaces 120) may be dedicated to receiving messages 110.

Figure 6:
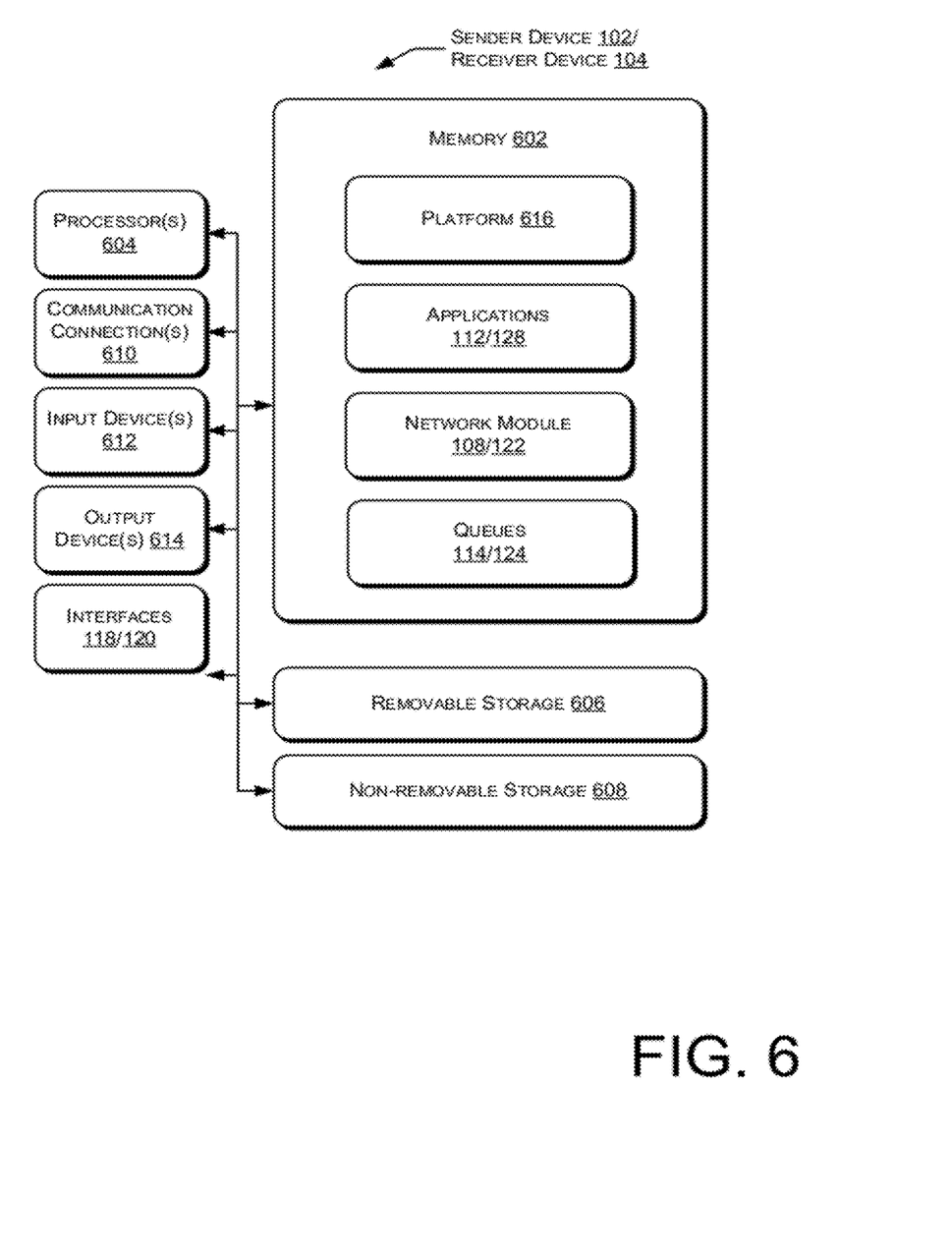
FIG. 6 is a block diagram of an example computer system architecture, in accordance with various embodiments.

In various embodiments, the sender devices 102 and receiver devices 104 may be any sort of computing devices. For example, the sender devices 102 and receiver devices 104 may be or include personal computers (PC), laptop computers, servers or server farms, mainframes, tablet computers, work stations, telecommunication devices, personal digital assistants (PDAs), media players, media center devices, personal video recorders (PVR), televisions, or any other sort of device or devices. In some implementations, one or more of the sender devices 102 and receiver devices 104 represents one or more virtual machines implemented on one or more computing devices. The nature and functions of the modules and data of the sender devices 102 and receiver devices 104 are described further herein. An example computing device for implementing one or both of a sender device 102 and a receiver device 104 is illustrated in FIG. 6 and is described below in greater detail with reference to that figure.

In various implementations, the network 106 may be any type or types of network, such as a wide area network (WAN), a local area network (LAN), or the Internet. Also, the network 106 may be public, private, or include both public and private networks. Further, the network 106 may be wired, wireless, or include both wired and wireless networks. The network 106 may utilize any one or more protocols for communication, such as TCP/IP, other packet based protocols, or other protocols. In one embodiment, the network 106 may comprise a cloud computing environment that connects a plurality of nodes of the cloud computing environment. In such an embodiment, the sender devices 102 and receiver devices 104 may be nodes of the cloud computing environment.

As mentioned above, the network 106 may be a packet-switched network. Such a network 106 may also be either a full bisection bandwidth or high bisection bandwidth network, allowing any node of the network to communicate with any other node at full speed without any delay in transmission introduced by intermediate nodes. In other embodiments, network 106 may be an infiniband network. The network 106 may also comprise one or more switches. The switches may be any sort of switches and may each include network interface components, such as incoming and outgoing network interface components, each network interface component having a bandwidth. For example, a switch may have a number of incoming Ethernet ports and an incoming wireless port, as well as outgoing Ethernet and wireless ports. In some embodiments, the incoming bandwidth of a switch is proportioned to the outgoing bandwidth of the switch. For instance, the collective incoming bandwidth of the network interfaces that serve devices "below" the switch in the network hierarchy may be ten gigabits per second, and the collective bandwidth of the network interface components up to core switches may also be ten gigabits per second. By proportioning the incoming and outgoing bandwidths of the switch, the introduction of bottlenecks associated with the switch is avoided. Such switches with proportioned bandwidths are described in further detail in U.S. patent application Ser. No. 12/410,697, which is entitled "Data Center Without Structural Bottlenecks" and was filed on Mar. 25, 2009, in U.S. patent application Ser. No. 12/410,745, which is entitled "Data Center Interconnect and Traffic Engineering" and was filed on Mar. 25, 2009, and in U.S. patent application Ser. No. 12/578,608, which is entitled "Agile Data Center Network Architecture" and was filed on Oct. 14, 2009.

In some embodiments, as shown in FIG. 1, the sender devices 102 and receivers devices 104 may each include applications. Sender devices 102 may include applications 112 and receiver devices 104 may include applications 128. Applications 112 and 128 may be any sort of applications capable of reading and writing data, such as the data messages 110. The applications 112 and 128 may be the same type of application or different types. Also, applications 112 may represent a plurality of application and applications 128 may represent a corresponding plurality of applications. Applications 112 may be clients, servers, or peers with respect to the applications 128. From the perspective of the applications 112 and 128, the exchanged data messages 110 are sent directly without any awareness of the RTS/CTS message exchange or the effective circuit.

In various embodiments, data messages 110 may comprise any sort of data of any type and may have any size. Each data message 110 may be packetized into one or more packets for transmission over the network 106 by an application 112, a network module 108, or some other component of a sender device 102, such as a platform or network stack of the sender device 102. The number of packets comprising the data message 110 may vary with the size of the data message 110 and the network protocol used to transmit the data message 110. In addition to its data, each data message 110 may be associated with metadata. Such metadata may include identification of the receiver device 104 that the data message 110 is directed to and, if the data message 110 is part of a group of data messages 110, a sequence number identifying a position of the data message 110 within the group.

In some embodiments, a network module 108 may comprise any one or more modules, applications, processes, threads, or functions. The network module 108 may be a component of the platform of a sender device 102 or of the network stack of a sender device 102 or may be independent of other sender device 102 modules and applications. As mentioned above, the network module 108 may be configured to perform at least one of receiving data messages 110, bifurcating received data messages 110, queuing data messages 110, selecting data messages 110 for transmission, transmitting RTS messages 116 for the selected data messages 110, receiving CTS messages 126 or BTL messages 126 in response, transmitting a data message 110 in response to a CTS message 126, or selecting an alternate data message 110 in response to a BTL message 126. In addition to these operations, the network module 108 may also manage the interfaces 118 of the sender device 102. These interfaces 118 may be selected by the network module 108 for the transmission of RTS messages 116 and data messages 110. Further, the network module 108 may perform these operations for any number of data messages 110 concurrently. For example, the network module 108 may receive a data message 110 from an application 112 while transmitting an RTS message 116 for another data message 110.

In some embodiments, upon reception of a data message 110 from an application 112, the network module 108 may determine whether the data message 110 is a control message or is smaller in size than a threshold in order to bifurcate the received data messages 110. The network module 108 provides data messages 110 that are control messages or smaller than a threshold to a network stack of the sender devices 102 for transmission using the interfaces 118 of the sender device 102. Data messages 110 that are not control messages and that are larger than the threshold are then queued by network module 108 for subsequent transmission.

In various embodiments, the network module 108 stores received data messages 110 in one queue 114 or several queues 114. The sender device 102 may have a single queue 114 in which data messages 110 for all receiver devices 104 are stored or may have a queue 114 associated with each receiver device 104. In other embodiments, the sender device 102 may utilize other numbers of queue 114 with other associations with receiver devices 104.

Figure 2A:
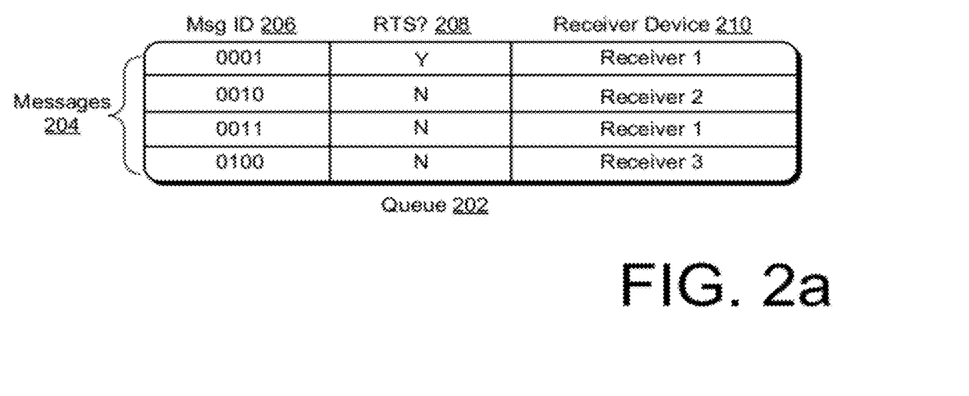
FIGS. 2a-2b show example queues of a sender device, in accordance with various embodiments.

FIG. 2a, for example, illustrates an example of a queue 114 for storing data messages 110 that are directed to multiple receiver devices 104. As shown in FIG. 2a, a queue 202 (which may be an example of a queue 114) includes entries 204 for multiple data messages 110. While these entries 204 are shown as rows of a table, it is to be understood that the entries 204 may also be represented as columns or as items in some non-tabular form. Each entry 204 includes a message identifier 206, an indicator 208 of whether an RTS message 116 has been sent for the data message 110 represented by that entry 204, and an identifier 210 of a target receiver device 104. Each message identifier 206 may be a data value of any type—such as an integer or string—that uniquely identifies a data message 110. Each indicator 208 may be, for example, a binary value or one of a limited set of other value types indicating whether an RTS message 116 has been sent. Each identifier 210 of a target receiver device 104 may be a network identifier of the receiver device 104, such as an IP address or other form of address.

Figure 2B:
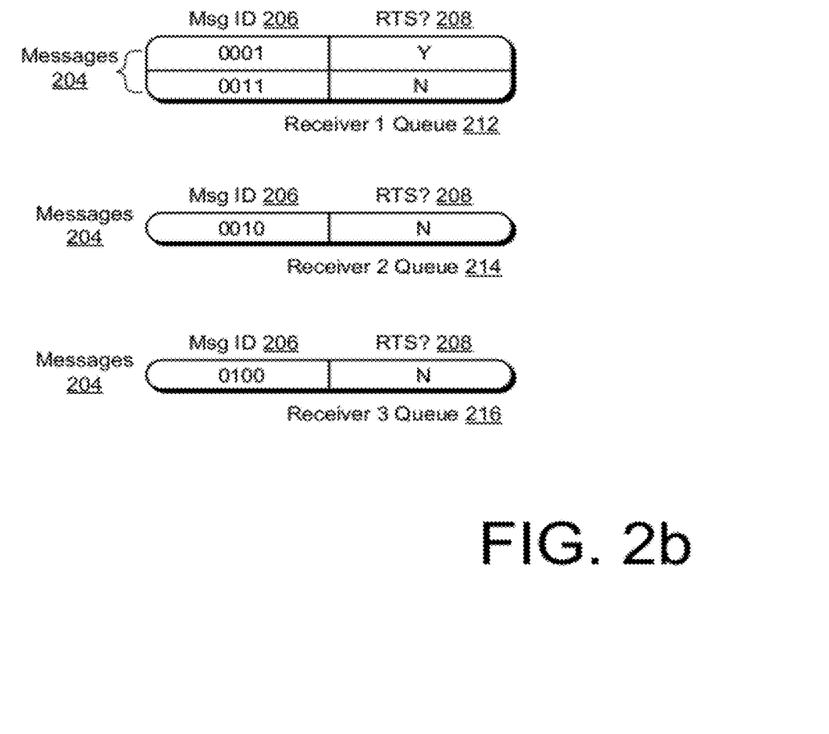

FIG. 2b illustrates examples of multiple queues 114 for storing data messages 110, one queue 114 for each of multiple receiver devices 104. As shown in FIG. 2b, each of queues 212, 214, and 216 (which may be examples of queues 114) include entries 204 for one or more data messages 110. While these entries 204 are shown as rows of a table, it is to be understood that the entries 204 may equally be represented as columns or as items in some non-tabular form. Each entry 204 includes a message identifier 206 and an indicator 208 of whether an RTS message 116 has been sent for the data message 110 represented by that entry 204. There is no need for a field representing an identifier 210 of the target receiver device 104 of a data message 110 because each of queues 212, 214, and 216 is associated with a specific receiver device 104. Each message identifier 206 may be a data value of any type—such as an integer or string—that uniquely identifies a data message 110. Each indicator 208 may be, for example, a binary value or one of a limited set of other value types indicating whether an RTS message 116 has been sent.

The queues 114 may be any sort of data structures known in the art, including data structures of modules, such as the network module 108, or other files or databases. Also, the queues 114 may be first-in-first-out (FIFO) data structures, as is known in the art, or may have data messages 110 added in or removed from the queues 114 in a different order. For example, data messages 110 may be added to the ends of the queues 114 but may be removed from the queues 114 in a different order. In such an example, the place of a data message 110 in the queue may be one of multiple factors in selecting and removing the data message 110 from a queue 114 for transmission.

In various embodiments, the network module 108 selects one or more data messages 110 from one or more of the queues 114 responsive to data messages 110 being added to a queue 114, responsive to a timer that estimates a time at which the sender device 102 will complete transmission of other data messages, or responsive to input from a platform of the sender device 102. The network module 108 may select data messages 110 from the queues 114 based on one or more factors. These factors may include a place of a data message 110 within a queue 114, which queue 114 that data messages 110 were previously selected from, sizes of data messages 110, available bandwidth of the sender device interfaces 118, an ability to chain together a number of data messages 110 for transmission to a single receiver device 104. These factors are provided only for the sake of illustration and any other number of factors may be used in the alternative.

In some embodiments, the network module 108 first determines an available bandwidth of the sender device interfaces 118. This available bandwidth may be a preset number known to the network module 108, such as a number representing eighty or ninety percent of the total bandwidth of the interfaces 118. In other embodiments, the available bandwidth may vary and may be determined repeatedly at different times.

The network module 108 may then select data messages 110 that will utilize as much of available bandwidth as possible for transmission. In one embodiment, the network module 108 selects data messages 110 from a head of a queue or queues 114 without reference to the receiver device 104 until the collective size of the selected data messages 110 approximates the available bandwidth. In other embodiments in which the sender device 102 has multiple queues 114 for multiple receiver devices 104, the network module 108 may service the queues in a round-robin fashion, selecting data messages 110 from a next queue 114 to be serviced. In further embodiments, the network module 108 may chain data messages 110 for a single receiver device 104, preferring to select multiple data messages 110 for the single receiver device 104 in order to reduce the number of receiver device bandwidth reservations that are needed. In such embodiments, the network module 108 tracks receiver devices 104 that chained data messages 110 have been transmitted to in order to prevent a single receiver device 104 from dominating message transmission. In yet other embodiments, the network module 108 prioritizes data messages 110 for which RTS messages 116 were previously sent and for which a threshold amount of time has passed. The reason for waiting a threshold amount of time is to allow the receiver device 104 that provided the BTL message 126 to complete its reception of other data messages 110 and free its reserved bandwidth.

In some embodiments, by considering the available bandwidth of the interfaces 118 in selecting the data messages 110, the network module 108 limits the number of data messages 110 that can be transmitted in parallel in order to avoid transmission bottlenecks on the sender device 102. Given that RTS messages 116 for a number of selected data messages 110 may be declined, however, the network module 108 may select a greater number of data messages 110 than there is available bandwidth to transmit in order to ensure full utilization of the available bandwidth.

In various embodiments, upon selecting the data messages 110, the network module 108 generates and transmits RTS messages 116 for the selected data messages 110. The network module 108 may generate and transmit an RTS message 116 for each selected data message 110 or may generate and transmit an RTS message 116 for a group of data messages 110 that are to be transmitted in parallel to a single receiver device 104. RTS messages 116 may be small messages that identify a specific data message 110 that they are associated with, a size or sizes of the data message 110 or messages 110 associated with that RTS message, an identifier to the target receiver device 104, and/or a message priority. The message priorities may be determined by the network module 108 based on the ratio of data messages 110 that are queued for the target receiver device 104 of the RTS message versus data messages 110 that are queued for other receiver devices 104, as well as on an overall size of the queue 114 or queues 114. In embodiments where the RTS message 116 is associated with a chain of data messages 110, the RTS message 116 may identify the number of data messages 110 for that receiver device 104.

Upon generating the RTS messages 116, the network module 108 selects one or more available interfaces 118 for transmission of the RTS messages 116. The interfaces 118 may be any sort of network interfaces known in the art, such as wired or wireless interfaces for WANs or LANs, wireless interfaces for PANs or Bluetooth® networks, or any other sort of interfaces. For example, interfaces 118 may comprise one or more network cards. These interfaces 118 may comprise a pool of interfaces that is managed by the network module 108 or another component as a collective resource that shares a same set of queues and queue states (i.e., queues 114). In one embodiment, the bandwidth of the interfaces 118 may be allocated to different processes, including one or more processes of the network module 108. This may include independent use of a single network interface 118 by multiple processes. As long as the processes have divided the network bandwidth statically ahead of time, the processes may use the allocated bandwidth without coordination. Upon selecting the one or more available interfaces 118, the network module 108 transmits the RTS messages 116 over the one or more available interfaces 118.

In response to sending RTS messages 116, the sender device 102 receives CTS messages 126, BTL messages 126, or both. One CTS message 126 or BTL message 126 may be returned to the sender device 102 for each RTS message 116 that it sends.

Upon receiving a CTS message 126 via an interface 118, the network module 108 determines which data message 110 or data messages 110 the CTS message 126 provides clearance for. As mentioned above, the receipt of a CTS message 126 from a receiver device 104 establishes an effective circuit between the sender device 102 and that receiver device 104. The CTS message 126 may identify a specific data message 110 by a message identifier 206 or may refer to a specific RTS message 116, which may in turn be related by the network module 108 to a specific data message 110. The CTS message 126 may also identify multiple data messages 110 that are cleared for transmission to the receiver device 104 that sent the CTS message 126. For example, the CTS message 126 may be responsive to an RTS message 116 that requested permission to send several data messages 110 to the receiver device 104. Such a CTS message 126 may provide clearance to send one, some, or all of the data messages 110 identified in the RTS message 116.

In various embodiments, upon determining the data messages 110 identified by the CTS messages 126, the network module 108 may select one or more of the interfaces 118 to transmit the data messages 110 and transmit the data messages 110 via the selected interfaces 118. In one embodiment, the interface 118 used to transmit a data message 110 may be different from the interface 118 used to transmit the RTS message 116 for that data message 110. Upon transmitting a data message 110, the network module 108 may remove the data message 110 from the queue or queues 114.

In addition to or instead of receiving one or more CTS messages 126, the sender device 102 may receive, via an interface 118, one or more BTL messages 126. Upon receiving a BTL message 126, the network module 108 determines which data message 110 or data messages 110 the BTL message 126 has declined. The network module 108 may then update the indicators 208 of those data messages 110 in the queues 114 to reflect that RTS messages 116 for those data messages 110 have been declined.

The network module 108 may then proceed to select one or more alternative data messages 110 for transmission in place of the declined data messages 110. In some embodiments, the network module 108 may utilize the above-described factors used to select the now-declined data messages 110 in selecting the alternative data messages 110. The network module 108 may also consider the size of the declined data message 110 or the collective size of multiple declined data messages 110 in selecting one or more alternative data messages 110. Also, in selecting the one or more alternative messages, the network module 108 may filter out data messages 110 for which an RTS message 116 has been declined and data messages 110 that are directed to the receiver device 104 from which the BTL message 126 was received. Once the alternative data messages 110 are selected, the network module 108 generates RTS messages 116 for the alternative data messages 110, selects interfaces 118 to use in transmitting the RTS messages 116, and transmits the RTS messages 116. By selecting alternative data messages 110 rather than waiting to transmit previously selected data messages 110, the network module 108 ensures that the sender device 102 does not sit idle while it has data messages 110 waiting for transmission.

In some embodiments, as mentioned above, the sender device 102 may utilize a timer to determine when to select further data messages 110 for transmission. The timer may be a part of the network module 108 or a separate component. The timer is initiated either when data messages 110 are selected or when transmission of data messages 110 begins and estimates the time for transmitting the data messages 110 based on the available bandwidth and the sizes of the data messages 110. Once that estimated time is reached, the timer informs the network module 108 that the time has been reached to enable the network module 108 to select further data messages 110 for transmission.

In various embodiments, a network module 116 may comprise any one or more modules, applications, processes, threads, or functions. The network module 116 may be a component of the platform of a receiver device 104 or of the network stack of a receiver device 104 or may be independent of other receiver device 104 modules and applications. As mentioned above, the network module 116 may be configured to perform at least one of receiving RTS messages 116, ordering the RTS messages 116, reserving bandwidth for one or more sender devices 102 of RTS messages 116, generating and sending CTS messages 126 to sender devices 102 for which bandwidth has been reserved, generating and sending BTL messages 126 to other sender devices 102, tracking the number of times BTL messages 126 have been sent to a sender device 102, and receiving data messages 110 using the reserved bandwidth. Further, the network module 116 may perform these operations for any number of data messages 110 concurrently. For example, the network module 116 may receive a data message 110 while transmitting a CTS message 126 responsive to an RTS message 116 for another data message 110.

In some embodiments, when a network module 116 receives RTS messages 116 via the interfaces 120, the network module 116 may queue these RTS messages in a queue 124 for ordering. The RTS messages 116 may be received from a plurality of sender devices 102, and the interfaces 120 receiving those RTS messages 116 may be any sort of interfaces, such as interfaces of the same or different types as the interfaces 118 described above. The queue 124 may be any sort of data structure, such as a data structure of the network module 116.

Figure 3:
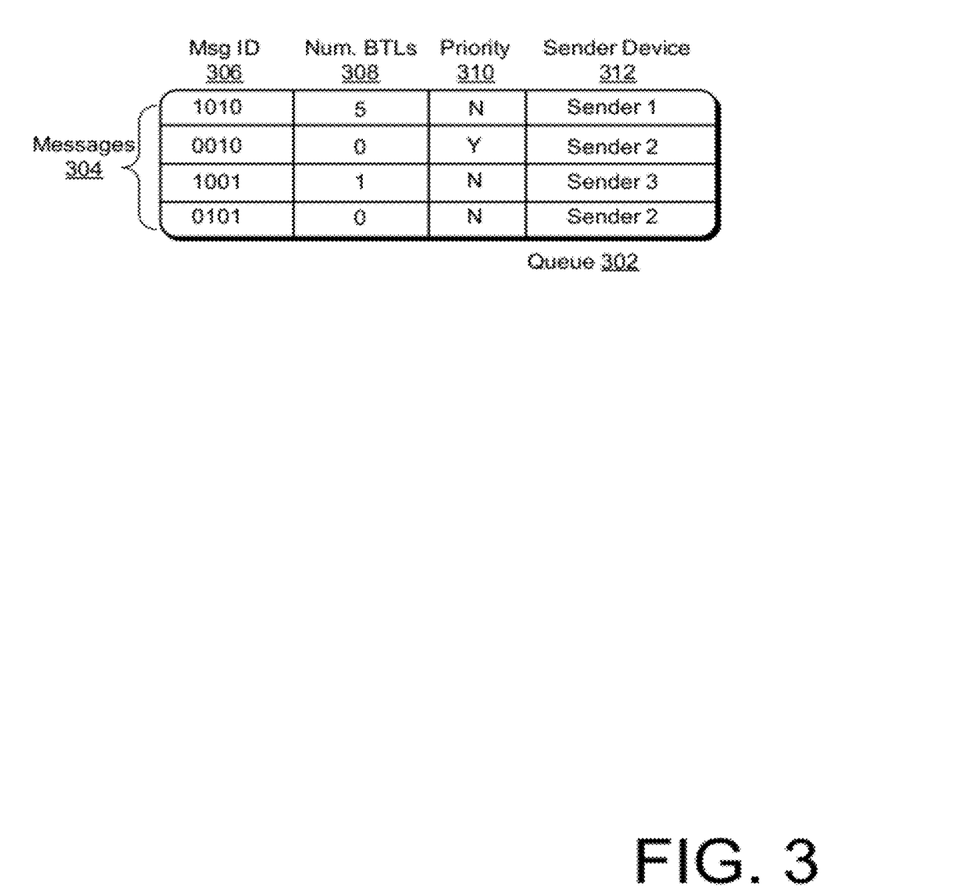
FIG. 3 shows an example queue of a receiver device, in accordance with various embodiments.

For example, FIG. 3 illustrates an example of a queue 124 that includes RTS message entries that are used to order the received RTS messages 116. As shown, a queue 302 (which may be an example of the queue 124) includes entries 304 for multiple RTS messages 116. While these entries 304 are shown as rows of a table, it is to be understood that the entries 304 may equally be represented as columns or as items in some non-tabular form. Each entry 304 includes a message identifier 306, a count 308 of BTL messages 126 sent to a sender device 102 responsive to RTS messages 116 associated with a specific data message 110, an indicator 310 of a priority of a data message 110 associated with the RTS message 116 of the entry 304, and an identifier 312 of a sender device 102 that sent the RTS message 116 of the entry 304. Each message identifier 306 may be a data value of any type—such as an integer or string—that uniquely identifies either the RTS message 116 or the data message 110 associated with that RTS message 116. Each count 308 may be an integer or some other number value that is retrieved from another data structure of the receiver device 104 which is used to track BTL messages 126 sent responsive to RTS messages 116 associated with a specific data message 110. When an RTS message 116 is received, the network module 116 checks this data structure for the number of BTL messages 126 associated with the data message 110 referenced by the received RTS message 116. Each indicator 310 may be, for example, a binary value or one of a limited set of other value types indicating whether has been prioritized. Alternatively, the indicator 310 for each entry 304 may indicate a specific priority level of a data message 110 if several priority levels are available. Each identifier 312 of a sender device 102 may be a network identifier of the sender device 102, such as an IP address or other form of address.

In various embodiments, the network module 116 may order the RTS messages 116 in the queue 124 based on any number of factors. For example, the network module 116 may order the RTS messages 116 based on message priorities and/or based on the count of BTL messages 126 mentioned above. The network module 116 may also consider the receiver device bandwidth available for reservation and the sizes of the data messages 110 corresponding to the RTS messages 116.

Based on the ordering, the network module may reserve bandwidth for one or more of the sender devices 102 associated with received RTS messages 116. These may be the sender devices 102 corresponding to the highest ordered RTS messages 116. In some embodiments, the network module 116 may apply a maximum bandwidth reservation for sender devices 102 such that no sender device 102 may be allocated the entire available bandwidth of the receiver device 102. This maximum bandwidth reservation may prevent a sender device 102 from monopolizing the receiver device bandwidth.

To effect the bandwidth reservations, the network module 116 sends CTS messages 126 to the sender devices 102 for which bandwidth is reserved. The CTS messages 126 may identify the RTS messages 116 that they are responsive to or the data messages 110 for which clearance is being provided. In some embodiments, the CTS messages 126 may also identify a number or identities of multiple data messages 110 in the case where an RTS message 116 identified multiple data messages 110.

The network module 116 may then generate and send BTL messages 126 in response to RTS messages 116 that did not result in a bandwidth reservation and CTS message 126 response. The BTL messages 126 may identify the RTS messages 116 that they are responsive to or the data messages 110 for which clearance is being declined. In some embodiments, the BTL messages 126 may also identify a number or identities of multiple data messages 110 in the case where an RTS message 116 identified multiple data messages 110. After sending the BTL messages 126, the network module 116 may update the counts of BTL messages for specific data messages 110 that are stored in a data structure of the receiver device 104, as discussed above. The network module 116 may also flush the queue 124 of the entries 304 in the queue 124 after each entry 304 is responded to with a CTS message 126 or a BTL message 126.

In various embodiments, the network module 116 may then receive the data messages 110 using the reserved bandwidth. Because the receiver device 104 only receives data messages 110 that it has provided clearance to send, the risk of buffer overflow at the receiver device 104 is averted. Upon receiving the data messages 110, the network module 116 provides the data messages 110 to the applications 128 to which they are directed and releases the bandwidth reservation(s) associated with the data messages 110. In some embodiments, completion of receiving the data messages 110 and release of the bandwidth reservations(s) triggers the sending of a next CTS message 126.

Example Operations

Figure 4:
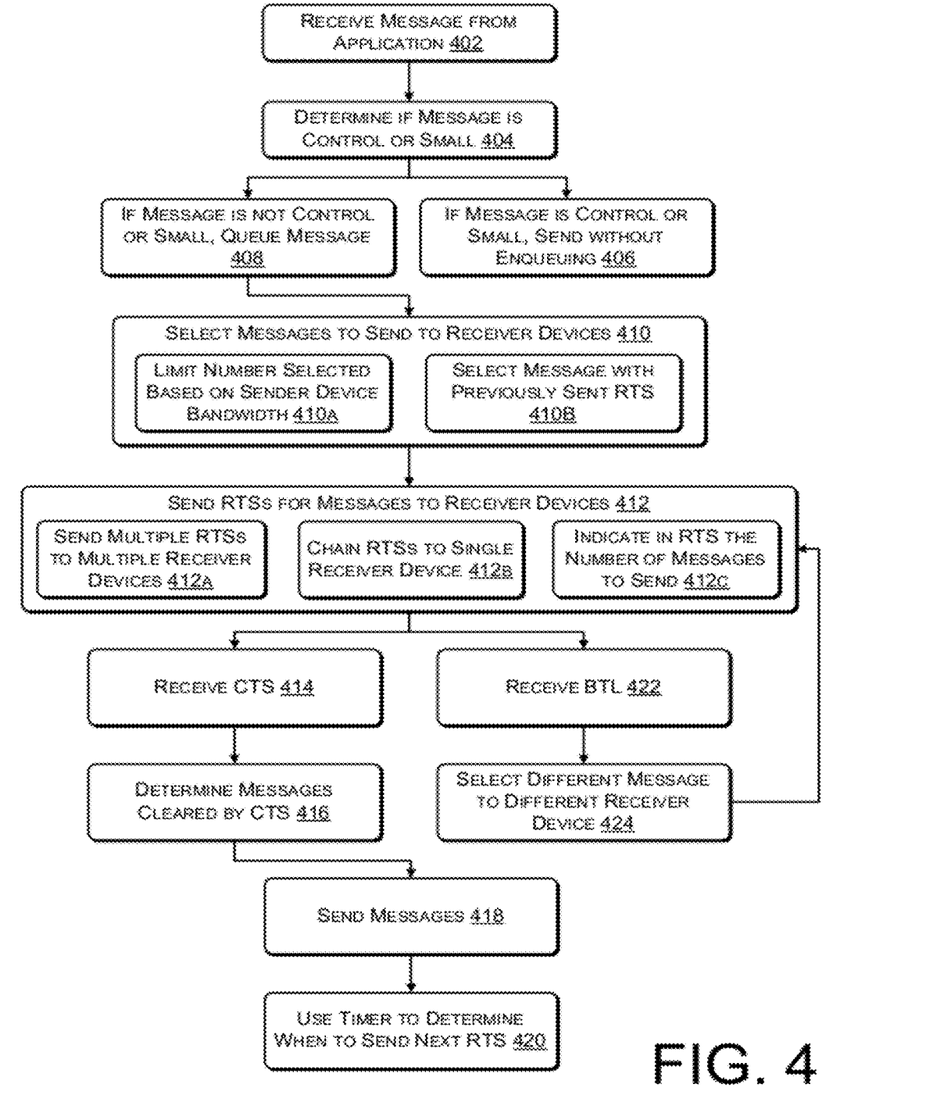
FIG. 4 is a flowchart showing a number of operations performed by a sender device to establish effective circuits with receiver devices over a packet-switched network, in accordance with various embodiments.
Figure 5:
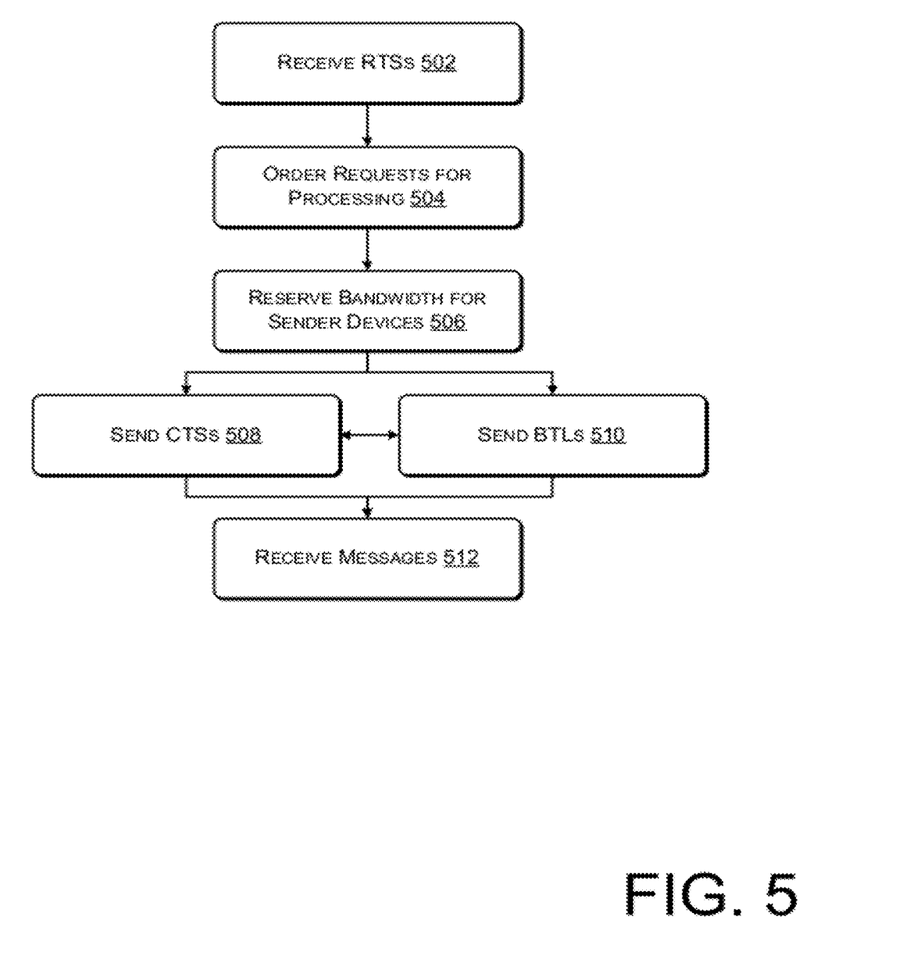
FIG. 5 is a flowchart showing a number of operations performed by a receiver device to establish an effective circuit with a sender device over a packet-switched network based on a reservation of receiver device bandwidth, in accordance with various embodiments.

FIGS. 4 and 5 are flowcharts illustrating example operations of processes. The example operations of the processes are illustrated in individual blocks and summarized with reference to those blocks. These processes are illustrated as logical flow graphs, each operation of which may represent a set of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

FIG. 4 is a flowchart showing a number of operations performed by a sender device to establish effective circuits with receiver devices over a packet-switched network, in accordance with various embodiments. As illustrated at block 402, a sender device may receive a message for transmission from one or more applications of that sender device to a receiver device. The sender device and receiver device may be connected by a packet-switched network, such as a full bisection bandwidth network or a high bisection bandwidth network. At block 404, upon receiving the message, the sender device may determine if the message is a control message or has a size that is smaller than a threshold size. At block 406, if the message is a control message or is smaller than the threshold size, the sender device may transmit the message to the receiver device specified for the message. At block 408, if the message is not a control message or is larger than the threshold size, the sender device queues the message for subsequent transmission.

At block 410, the sender device selects a message for transmission to a receiver device. The sender device may select a message from a sender device queue, such as the first message in the queue. In some embodiments, the sender device may select multiple messages for transmission, such as multiple messages to a same receiver device for chained transmission or multiple messages to multiple receiver devices. At block 410a, the sender device limits the number of messages selected based on an available transmission bandwidth of the sender device so that all messages selected may be transmitted concurrently without waiting for any others of the selected messages to complete sending. At block 410b, the sender device may select a message from a queue that is associated with a previous request to send (RTS). The sender device may have previously sent an RTS for that message and may have received a response declining permission to send the message.

At block 412, the sender device sends an RTS for the selected message. The RTS may include the size of the message. In some embodiments, sending comprises sending the multiple requests via multiple interfaces of the sender device, the multiple interfaces sharing a same set of message queues and queue states. In one embodiment, the RTS may be sent via a different interface than the message. At block 412a, the sender device sends multiple RTSs to multiple receiver devices in parallel. At block 412b, the sender device chains RTSs to a single receiver device, sending the chained RTSs to the receiver device concurrently. At 412c, the chaining may include indicating in a single RTS the number of messages that the sender device has to send to the receiver device.

In response to the RTS, the sender device receives a clearance to send (CTS) at block 414 or response declining the RTS (referred to herein as a "busy try later" (BTL) message) at block 422. At block 414, the sender device receives a CTS from the receiver device. The RTS and CTS create an effective circuit between the sender device and receiver device over the packet-switched network. The receiver device sends CTS messages to sender devices that it has reserved bandwidth for. At block 416, the sender device determines which messages were cleared by the CTS. For example, if the sender device indicated at block 412*c* that the sender device has ten messages to transmit, the receiver device might only respond with a CTS or CTSs clearing five of the messages. At block 418, the sender device sends the cleared message or messages to the receiver device to be received by the receiver device using the reserved band width. By utilizing its full bandwidth and the reserved bandwidth of receiver devices, the sender device ensures that the messages are sent without any delay, packet loss, or unused bandwidth.

At block 420, the sender device utilizes a timer to estimate when a next message should be transmitted to a receiver device. The timer estimates a time to send the selected message or messages and thus a time when message transmission will be complete and sender device bandwidth will be available.

At block 422, rather than receiving a CTS, the sender device receives a BTL from the receiver device declining the request to send the message. At block 424, responsive to the BTL, the sender device selects another message to send to another receiver device. In some embodiments, the sender device selects the first message in the queue for which an RTS has not been sent and which is directed to another receiver device. An RTS message for the other message is then sent at block 412. The sender device selects another message for transmission with the RTS is declined to ensure that the sender device does not sit idle while it has messages to transmit and available bandwidth to transmit those messages.

FIG. 5 is a flowchart showing a number of operations performed by a receiver device to establish an effective circuit with a sender device over a packet-switched network based on a reservation of receiver device bandwidth, in accordance with various embodiments. As illustrated at block 502, a receiver device may receive a plurality of requests to send (RTS) messages from a plurality of sender devices. In some embodiments, the RTS messages include sizes of the messages that the sender devices are requesting to send. At block 504, upon receiving these RTS messages, the receiver device may order the RTS messages based at least on one of priorities included in one or more of the RTS messages or on a number of times a sender device has received responses declining its RTS messages.

At block 506, the receiver device may reserve bandwidth for at least one sender device for receiving messages from the at least one sender device. The at least one sender device may have its RTS message selected from the ordered RTS messages. In some embodiments, the receiver device reserves bandwidth for receiving multiple messages from a sender device corresponding to multiple RTS messages. Also, in further embodiments, the number of sender devices for whom bandwidth is reserved may be related to sizes of the messages the sender devices are requesting to send. At block 508, the receiver device then responds to the RTS message or RTS messages of the at least one sender device, providing that at least one sender device with clearance to send (CTS) a message or messages using the reserved bandwidth.

At block 510, the receiver device responds to the other sender devices with responses declining the RTS messages of the other sender devices. These negative responses are referred to herein as "busy try later" (BTL) messages. The BTL messages indicate to the other sender devices that they should send RTS messages to other receiver devices in order to fully utilize their sender device bandwidths. In some embodiments, when the receiver device sends a BTL message to a sender device, it increments a representation of a number of BTL messages sent to that sender device. The representation is then used for subsequent ordering operations.

At block 512, the receiver device receives the message or messages from the at least one sender device using the reserved bandwidth.

Example System Architecture

FIG. 6 is a block diagram of an example computer system architecture for a sender device 102 or a receiver device 104, in accordance with various embodiments. As shown, the sender device 102/receiver device 104 may comprise at least a memory 602 (including a cache memory) and one or more processing units (or processor(s)) 604. The processor(s) 604 may be implemented as appropriate in hardware, software, firmware, or combinations thereof. Software or firmware implementations of the processor(s) 604 may include computer-executable or machine-executable instructions written in any suitable programming language to perform the various functions described. Processor(s) 604 may also or alternatively include one or more graphic processing units (GPUs).

Memory 602 may store program instructions that are loadable and executable on the processor(s) 604, as well as data generated during the execution of these programs. Depending on the configuration and type of computing device, memory 602 may be volatile (such as random access memory (RAM)) and/or non-volatile (such as read-only memory (ROM), flash memory, etc.). The computing device or server may also include additional removable storage 606 and/or non-removable storage 608 including, but not limited to, magnetic storage, optical disks, and/or tape storage. The disk drives and their associated computer-readable media may provide non-volatile storage of computer readable instructions, data structures, program modules, and other data for the computing devices. In some implementations, the memory 602 may include multiple different types of memory, such as static random access memory (SRAM), dynamic random access memory (DRAM), or ROM.

Computer-readable media includes, at least, two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, erasable programmable read-only memory (EEPROM), flash memory or other memory technology, compact disc read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

The sender device 102/receiver device 104 may also contain communications connection(s) 610 that allow the sender device 102/receiver device 104 to communicate with a stored database, another computing device or server, user terminals, and/or other devices on a network, such as network 106. The sender device 102/receiver device 104 may also include input device(s) 612, such as a keyboard, mouse, pen, voice input device, touch input device, etc., and output device(s) 614, such as a display, speakers, printer, etc.

The sender device 102/receiver device 104 may further include an interface 118/120 for sending and receiving data across the network 106. As mentioned above, the interface 118/120 may comprise any number of network interfaces, each having an associated bandwidth for transmitting and receiving data.

Turning to the contents of the memory 602 in more detail, the memory 602 may include platform 616. The platform 616 may comprise an operating system and/or one or more application programs or services. If the memory 602 belongs to a sender device 102, the memory 602 may also include a network module 108 and applications 112, which may each represent any one or more modules, applications, processes, threads, or functions, and one or more queues 114, which may represent any storage formats or data structures. The network module 108, applications 112, and queues 114 are described above in greater detail. If the memory 602 belongs to a receiver device 104, the memory 602 may also include a network module 122 and applications 128, which may each represent any one or more modules, applications, processes, threads, or functions, and one or more queues 124, which may represent any storage formats or data structures. The network module 122, applications 128, and queues 124 are described above in greater detail.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A method comprising:
    sending, by an end-point sender device, a request to an end-point receiver device connected to the end-point sender device by a packet-switched network, the request associated with a bandwidth reservation from the end-point receiver device and the request indicating a first number of messages that the end-point sender device has to send to the end-point receiver device;
    receiving, by the end-point sender device, a response from the end-point receiver device providing clearance to send a second number of messages that is less than the first number of messages to the end-point receiver device using reserved bandwidth of the end-point receiver device, the request and the response creating an effective circuit between the end-point sender device and the end-point receiver device over the packet-switched network; and
    in response to creating the effective circuit, sending the second number of messages from the end-point sender device to the end-point receiver device.

2. The method of claim 1, further comprising:
    determining if another message is smaller than a threshold size; and
    responsive to determining that the other message is smaller than the threshold size, sending the other message from the end-point sender device to the end-point receiver device without sending a prior request associated with a bandwidth reservation.

3. The method of claim 1, further comprising sending multiple requests to multiple end-point receiver devices in parallel.

4. The method of claim 3, wherein the sending the multiple requests to multiple end-point receiver devices in parallel comprises sending the multiple requests via multiple interfaces of the end-point sender device, the multiple interfaces sharing a same set of message queues and queue states.

5. The method of claim 4, further comprising sending the request via one of the multiple interfaces and sending the second number of messages via another of the multiple interfaces.

6. The method of claim 3, further comprising limiting a number of the multiple requests sent based on an available bandwidth of the end-point sender device.

7. The method of claim 1, further comprising checking a timer to determine when to send one or more additional requests, the timer estimating a time to send declined messages from the first number of messages.

8. The method of claim 1, further comprising concurrently sending multiple requests for multiple messages to the end-point receiver device.

9. The method of claim 1, wherein the packet-switched network is a full bisection bandwidth network or a high bisection bandwidth network.

10. The method of claim 1, wherein an individual message of the second number of messages comprises one or more data packets to be communicated to the end-point receiver device on behalf of an application executing on the end-point sender device.

11. The method of claim 1, wherein an individual message of the first number of messages exceeds a threshold data size.

12. An end-point sender device comprising:
    a processor;
    one or more memories; and
    a network module, stored on the one or more memories and when operated by the processor, performs operations comprising:
        sending, from the end-point sender device to a first end-point receiver device, a first request to send (RTS) a first queued message, the first RTS seeking a first bandwidth reservation from the first end-point receiver device for reception of the first queued message from the end-point sender device;
        receiving a response from the first end-point receiver device declining the first RTS;
        based on the response, sending a second RTS to a second end-point receiver device, the second RTS seeking a second bandwidth reservation from the second end-point receiver device for reception of a second queued message from the end-point sender device;
        prioritizing the first RTS over a third RTS to be sent in association with a third queued message based at least in part on the first end-point receiver device declining the first RTS; and re-sending, from the end-point sender device to the first end-point receiver device, the first RTS prior to sending the third RTS.

13. The end-point sender device of claim 12, further comprising one or more queues storing messages for transmission to end-point receiver devices.

14. The end-point sender device of claim 13, wherein the one or more queues include a queue for each end-point receiver device, the one or more queues being serviced in a round-robin order.

15. The end-point sender device of claim 13, wherein the operations further comprise selecting as the second queued message from the one or more queues a message that is not directed to the first end-point receiver device and for which an RTS has not been previously sent.

16. The end-point sender device of claim 12, wherein the operations further comprise starting a timer to determine when to re-send the first RTS from the end-point sender device to the first end-point receiver device, and wherein the re-sending is performed in response to the timer indicating that a threshold period of time has elapsed.

17. One or more computer-readable storage media comprising computer-executable instructions configured to cause an end-point receiver device to perform operations comprising:

receiving, by the end-point receiving device, a plurality of requests to send messages from a plurality of end-point sender devices;

prioritizing the plurality of requests for processing;

determining a request that indicates a highest priority from the plurality of requests;

reserving, at the end-point receiving device, bandwidth for at least one of the end-point sender devices associated with the request that indicates the highest priority; and sending, to the at least one of the end-point sender devices, a response providing clearance to begin sending one or more messages to the end-point receiver device using the reserved bandwidth.

18. The one or more computer-readable storage media of claim 17, wherein the operations further comprise sending additional responses declining other requests of the plurality of requests to others of the end-point sender devices.

19. The one or more computer-readable storage media of claim 17, wherein the operations further comprise:

tracking a number of times an end-point sender device has been declined; and prioritizing the plurality of requests for processing based on the number of times the respective end-point sender devices have been declined.

20. The one or more computer-readable storage media of claim 17, wherein the plurality of requests indicate message sizes and the operations further comprise reserving bandwidth based on the message sizes.

* * * * *